(12) United States Patent
Yang et al.

(10) Patent No.: US 11,760,080 B2
(45) Date of Patent: Sep. 19, 2023

(54) PEELING DEVICE AND PEELING METHOD USING THE SAME

(71) Applicant: Samsung Display Co., Ltd., Yongin-si (KR)

(72) Inventors: Daeho Yang, Asan-si (KR); Sunkwan Kim, Cheonan-si (KR); Jongdae Kim, Goyang-si (KR); Sunghoon Lee, Cheonan-si (KR); Ilsoo Jang, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/445,976

(22) Filed: Aug. 26, 2021

(65) Prior Publication Data

US 2022/0212459 A1     Jul. 7, 2022

(30) Foreign Application Priority Data

Jan. 7, 2021    (KR) .................. 10-2021-0001722

(51) Int. Cl.
     *B32B 43/00*      (2006.01)

(52) U.S. Cl.
     CPC ........ *B32B 43/006* (2013.01); *B32B 2309/66* (2013.01); *B32B 2457/20* (2013.01); *Y10T 156/1111* (2015.01); *Y10T 156/1126* (2015.01)

(58) Field of Classification Search
     CPC .............. B32B 2457/20; B32B 43/006; B32B 2309/66; B65H 5/08; B65H 41/00; B65H 29/54; B65H 2301/51122; B65H 2701/1726; Y10T 156/1116; Y10T 156/1111; Y10T 156/1126; Y10T 156/1168; Y10T 156/1132; Y10T 279/11
See application file for complete search history.

(56) References Cited

U.S. PATENT DOCUMENTS 8,465,992 B2    6/2013   Kim et al.
9,570,329 B2 *    2/2017   Eguchi ................ H01L 51/0097

FOREIGN PATENT DOCUMENTS

| KR | 10-2012-0042151 A | 5/2012 |
| KR | 10-2019-0094629 A | 8/2019 |
| KR | 10-2036367 B1 | 10/2019 |

\* cited by examiner

*Primary Examiner* — Galen H Hauth
*Assistant Examiner* — Alexander S Wright
(74) *Attorney, Agent, or Firm* — Lewis Roca Rothgerber Christie LLP

(57) ABSTRACT

A peeling device includes a peeling tank for containing a first solution therein, a support portion on which a stack structure including a base layer extending in a first direction and a film coupled with the base layer is disposed, the support portion being disposed in the peeling tank and an adsorption device for adsorbing the base layer thereon to peel off the base layer from the film, the adsorption device including an adsorption portion for adsorbing the base layer, and a moving portion coupled with the adsorption portion for moving the adsorption portion to allow the base layer to be bent to a second direction crossing the first direction and to be peeled off from the film.

11 Claims, 13 Drawing Sheets

PEELING DEVICE AND PEELING METHOD USING THE SAME

CROSS-REFERENCE TO RELATED APPLICATION

This application claims priority to, and the benefit of, Korean Patent Application No. 10-2021-0001722, filed on Jan. 7, 2021, the contents of which are hereby incorporated by reference in its entirety.

BACKGROUND

1. Field

The present disclosure relates to a peeling device that peels off a base layer from a film, and a peeling method using the same.

2. Description of the Related Art

Various types of display devices are used to provide image information. In recent years, flexible display devices, including a flexible display panel that is foldable or bendable, are being used. Different from a rigid display device, the flexible display device is able to be folded, rolled, or bent. Because the shape of the flexible display device is changed in various ways, the flexible display device is able to be carried regardless of its original screen size.

The flexible display device may suitably have a window that covers the display panel to protect the display panel from external impacts without interfering with the folding or bending operation. Accordingly, it may be suitable to develop a flexible window that has high durability against external impacts, and that is able to perform the folding or bending operation.

SUMMARY

The present disclosure provides a peeling device capable of peeling off a flexible base layer from an adhesive layer. The present disclosure also provides a peeling method using such a peeling device.

Embodiments of the present disclosure provide a peeling device including a peeling tank containing a first solution therein, a support portion on which a stack structure including a base layer extending in a first direction and a film coupled with the base layer is disposed, the support portion being disposed in the peeling tank and an adsorption device for adsorbing the base layer thereon to peel off the base layer from the film, the adsorption device including an adsorption portion for adsorbing the base layer, and a moving portion coupled with the adsorption portion for moving the adsorption portion to allow the base layer to be bent to a second direction crossing the first direction and to be peeled off from the film.

The first solution may include water having a temperature from about 50° C. to about 90° C.

The base layer may include an upper surface to be adsorbed to the adsorption portion, and a lower surface coupled with the film, wherein the adsorption device is configured to peel the lower surface of the base layer off of the film.

The peeling device may further include a first nozzle, wherein the first nozzle faces a peeling area of the lower surface when the base layer is bent to the second direction by the adsorption device and spray a second solution to the peeling area of the lower surface and the film, and the second solution includes a same material as the first solution.

The peeling device may further include a second nozzle, wherein the second nozzle sprays a third solution to the upper surface, and the third solution includes a same material as the first solution.

The base layer may include a first base layer, and a second base layer, wherein the film includes an adhesive film between the first and second base layers to attach the first base layer to the second base layer, and wherein the adsorption portion is configured to be adsorbed to the second base layer.

The peeling device may further include a grip device that grips the film to remove the film from the peeling tank.

The moving portion may be configured to move the adsorption portion with the second base layer adsorbed thereto to a second position from a first position such that the base layer is peeled off from the film before moving the adsorption portion to allow the second base layer to be bent to the second direction.

The second direction may be substantially perpendicular to the first direction.

The base layer may include a thin film glass substrate.

The adsorption portion may include a plurality of adsorption pads configured to be adsorbed to the base layer, and a connection portion connecting the moving portion to the adsorption pads, wherein the base layer includes a first area at a center portion of the base layer, a second area around the first area, and adsorption points to be adsorbed to the adsorption pads in the second area.

Embodiments of the present disclosure provide a peeling method using a peeling device. The peeling method includes locating a stack structure including a base layer extending in a first direction, and a film coupled with the base layer, on a support portion in a peeling tank containing a first solution, and adsorbing the base layer using an adsorption device to peel off the base layer from the film, the peeling off of the base layer including adsorbing an adsorption portion to the base layer, and moving the adsorption portion using a moving portion to allow the base layer to be bent to a second direction crossing the first direction and to be peeled off from the film.

The first solution may include water having a temperature from about 50° C. to about 90° C.

The base layer may include an upper surface to be adsorbed to the adsorption portion, and a lower surface coupled with the film, wherein the method further includes peeling the lower surface of the base layer off of the film.

The peeling method may further include spraying a second solution to a peeling area of the lower surface and the film through a first nozzle facing the peeling area of the lower surface when the base layer is bent, the second solution including a same material as the first solution.

The peeling method may further include spraying a third solution to the upper surface through a second nozzle, the third solution including a same material as the first solution.

The base layer may include a first base layer, and a second base layer, wherein the film includes an adhesive film between the first and second base layers to attach the first base layer to the second base layer.

The peeling method may further include gripping the film using a grip device to remove the film from the peeling tank, wherein the second base layer is adsorbed to the adsorption portion in the adsorbing of the adsorption portion to the base layer, and wherein the second base layer is peeled off of the film in the peeling off of the base layer from the film.

The peeling off of the base layer from the film may include moving the adsorption portion to a second position from a first position.

The base layer may include a thin film glass substrate.

According to the above, in the stack structure including the flexible base layers and the film coupled to the base layers, the base layer is peeled off from the film using the peeling device. When the base layer is peeled off from the film using the peeling device, damage to the base layer may be reduced. Accordingly, the reliability of the peeling process for peeling the base layer from the film, and the efficiency of the process, are improved.

BRIEF DESCRIPTION OF THE DRAWINGS

The above and other aspects of the present disclosure will become readily apparent by reference to the following detailed description when considered in conjunction with the accompanying drawings, wherein.

DETAILED DESCRIPTION

Figure 1A:
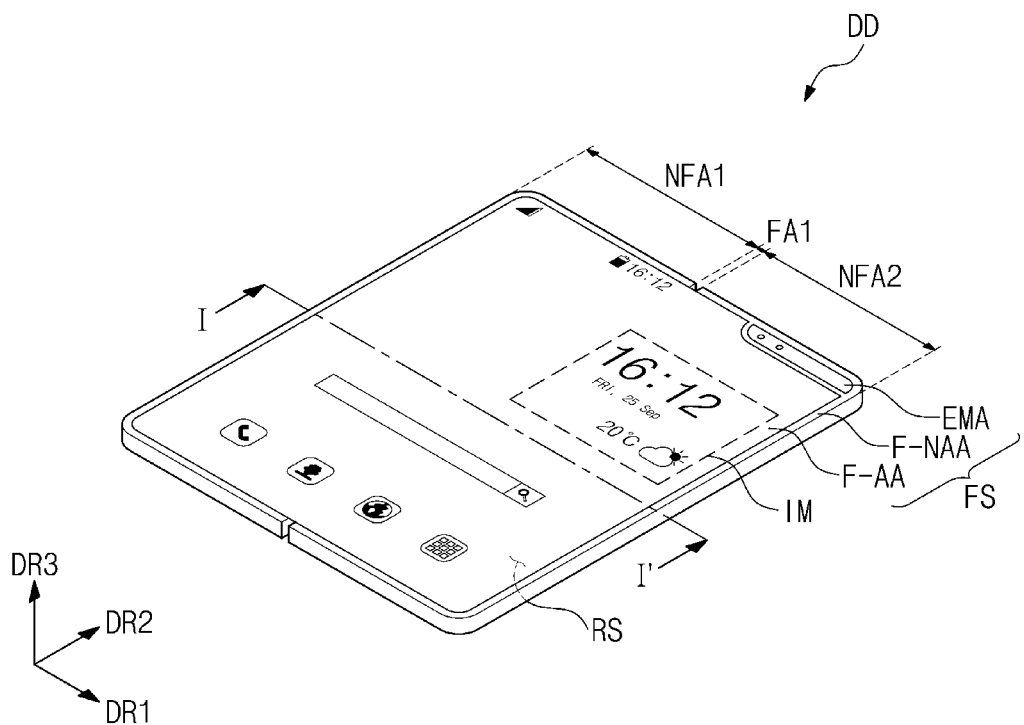
FIG. 1A is a perspective view showing a display device in an unfolded state according to some embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1B:
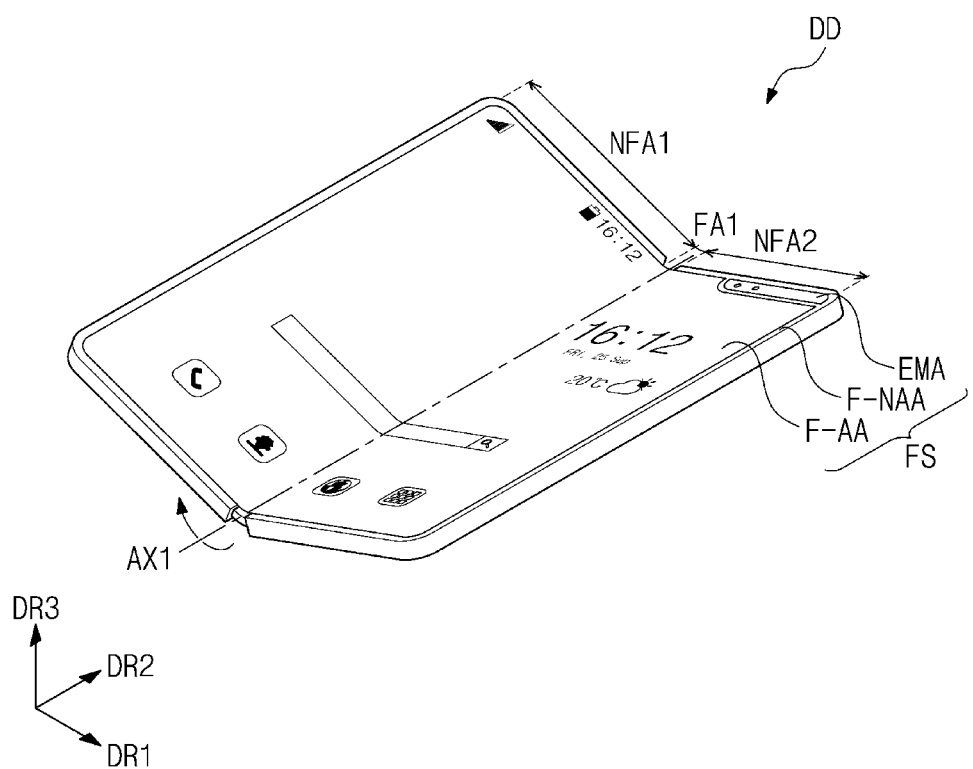
FIG. 1B is a perspective view showing the display device of FIG. 1A in the midst of a folding process.

FIG. 1A is a perspective view showing a display device DD in an unfolded state according to some embodiments of the present disclosure, and FIG. 1B is a perspective view showing the display device DD shown in FIG. 1A in the midst of a folding process.

Referring to FIG. 1A, the display device DD may be a device that is activated in response to an electrical signal. The display device DD may include various embodiments. For example, the display device DD may include a tablet computer, a notebook computer, a computer, a smart television, and the like. In some embodiments, a foldable smartphone will be described as a representative example of the display device DD.

The display device DD may have a rectangular shape defined by short sides extending in a first direction DR1, and long sides extending in a second direction DR2 crossing the first direction DR1. The second direction DR2 may be substantially perpendicular to the first direction DR1. However, the shape of the display device DD should not be limited thereto or thereby, and the display device DD may have a variety of shapes.

The display device DD may display an image IM through a first display surface FS, which is substantially parallel to each of the first direction DR1 and the second direction DR2. The image IM may be displayed toward a third direction DR3. The first display surface FS through which the image IM is displayed may correspond to a front surface of the display device DD. The image IM may include a still image and may include a video. FIG. 1A shows an internet search box and a clock widget as a representative example of the image IM.

In some embodiments, front (or upper) and rear (or lower) surfaces of each member of the display device DD may be defined with respect to a direction in which the image IM is displayed. The front and rear surfaces may be opposite to each other with respect to the third direction DR3, and a normal line direction of each of the front and rear surfaces may be substantially parallel to the third direction DR3.

A separation distance in the third direction DR3 between the front surface and the rear surface may correspond to a thickness, or a height, in the third direction DR3 of the display device DD. Meanwhile, directions indicated by the first, second, and third directions DR1, DR2, and DR3 are relative to each other, and may be changed to other directions.

The display device DD may sense an external input applied thereto from the outside. The external input may include inputs of various forms provided from the outside of the display device DD. For example, the external input may include external inputs in proximity to, or approaching close to, the display device DD at a distance (e.g., a predetermined distance, which may correspond to a hovering input) as well as a touch input by a user's body (e.g., by a hand of a user). In addition, the external input may include various forms, such as force, pressure, temperature, or light.

The display device DD according to some embodiments may include the first display surface FS and a second display surface RS. The first display surface FS may include an active area F-AA, a peripheral area F-NAA, and an electronic module area EMA. The second display surface RS may be opposite to at least a portion of the first display surface FS. That is, the second display surface RS may be defined as a portion of the rear surface of the display device DD.

The active area F-AA may be activated in response to the electrical signal. The image IM may be displayed through the active area F-AA, and various external inputs may be sensed through the active area F-AA. The peripheral area F-NAA may be defined as being adjacent to the active area F-AA. The peripheral area F-NAA may have a color (e.g., a predetermined color). The peripheral area F-NAA may surround the active area F-AA. Accordingly, the active area F-AA may have a shape that is substantially defined by the peripheral area F-NAA, however, this is merely one example. In other embodiments, the peripheral area F-NAA may be defined to be adjacent to only one side of the active area F-AA, or may be omitted. The display device DD according to some embodiments may include active areas of various shapes, and should not be particularly limited.

Various electronic modules may be located in the electronic module area EMA. As an example, a corresponding electronic module may include at least one of a camera, a speaker, an optical sensor, and/or a thermal sensor. The electronic module area EMA may sense an external subject through the first and/or second display surfaces FS and RS, and/or may provide a sound signal, such as a voice, to the outside through the first and/or second display surfaces FS and RS. In addition, the electronic module may include a plurality of components, and the electronic module should not be limited to any particular embodiments.

The electronic module area EMA may be surrounded by the active area F-AA and the peripheral area F-NAA, however, the electronic module area EMA should not be limited thereto or thereby. The electronic module area EMA may be defined in the active area F-AA, and the electronic module area EMA should not be particularly limited.

The display device DD according to some embodiments may include at least one folding area FA1, and a plurality of non-folding areas NFA1 and NFA2 extending from the folding area FA1. The non-folding areas NFA1 and NFA2 may be spaced apart from each other with the folding area FA1 interposed therebetween.

Referring to FIG. 1B, the display device DD may include a folding axis AX1 that is imaginary, and that extends in the second direction DR2. The folding axis AX1 may extend in the second direction DR2 on the first display surface FS. That is, the folding axis AX1 may extend along a major axis of the display device DD.

According to some embodiments, the non-folding areas NFA1 and NFA2 may be located to be adjacent to the folding area FA1 with the folding area FA1 interposed therebetween. For example, a first non-folding area NFA1 may be located adjacent to one side of the folding area FA1 in the first direction DR1, and a second non-folding area NFA2 may be located adjacent to the other side of the folding area FA1 in the first direction DR1.

The display device DD may be folded about the folding axis AX1 to be in an in-folding state where one area (e.g., a first area) of the first display surface FS, which overlaps the first non-folding area NFA1, faces the other area (e.g., a second area) of the first display surface FS, which overlaps the second non-folding area NFA2. However, the present disclosure should not be limited to the in-folding state. The display device DD may be folded about the folding axis AX1 to be in an out-folding state where one area of the second display surface RS, which overlaps the first non-folding area NFA1, faces the other area of the second display surface RS, which overlaps the second non-folding area NFA2.

Figure 2:
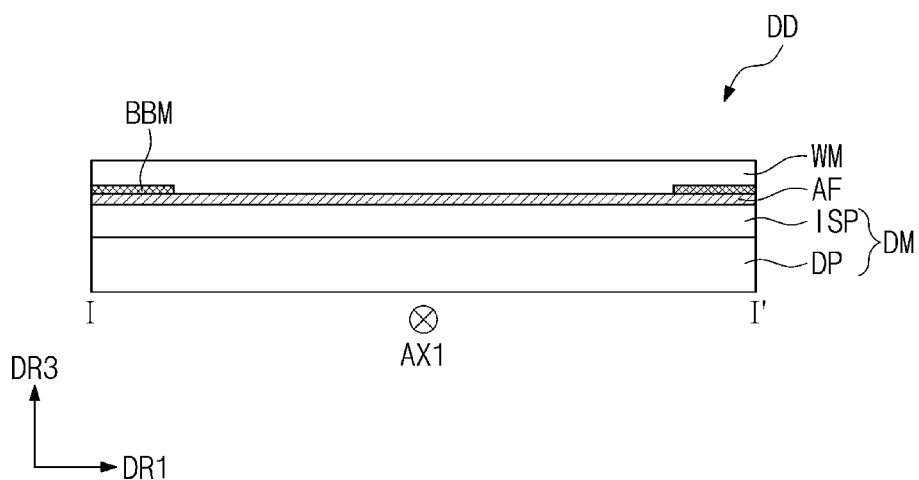
FIG. 2 is a cross-sectional view taken along the line I-I' shown in FIG. 1A.

FIG. 2 is a cross-sectional view taken along the line I-I' shown in FIG. 1A.

Referring to FIG. 2, the display device DD may include a display module DM, an adhesive film AF, and a window WM. The display module DM may include a display panel DP and an input sensor ISP.

According to some embodiments, the display panel DP may be a light-emitting type display panel, however, the display panel DP should not be particularly limited. For instance, the display panel DP may be an organic light emitting display panel.

The input sensor ISP may be located directly on the display panel DP. According to some embodiments, the input sensor ISP may be formed on the display panel DP through successive processes. That is, in the case where the input sensor ISP is located directly on the display panel DP, an inner adhesive film may be omitted from between the input sensor ISP and the display panel DP. However, in other embodiments, the inner adhesive film may be located between the input sensor ISP and the display panel DP. In this case, the input sensor ISP is not manufactured together with the display panel DP through the successive processes. That is, the input sensor ISP may be fixed to an upper surface of the display panel DP by the inner adhesive film after being manufactured through a separate process from the display panel DP.

The display panel DP may generate the image, and the input sensor ISP may obtain coordinate information on the external input (e.g., a touch event). The display module DM may be flexible. Accordingly, the display panel DP and the input sensor ISP may be rolled, folded or unfolded with respect to the folding axis AX1.

The window WM may be located on the display module DM. The window WM may include an optically transparent insulating material. Therefore, the image generated by the display module DM may be easily viewed by the user through the window WM. The window WM may transmit the image from the display module DM, and may substantially simultaneously buffer external impacts to reduce or prevent the likelihood of damage to the display module DM, or of causing malfunctioning of the display module DM, due to the external impacts. The external impacts indicate external force represented by pressure or stress, which causes defects in the display module DM.

The window WM may include a flexible material. Accordingly, the window WM may be folded or unfolded with respect to the folding axis AX1. That is, a shape of the window WM may be changed when a shape of the display module DM is changed.

Figure 3:
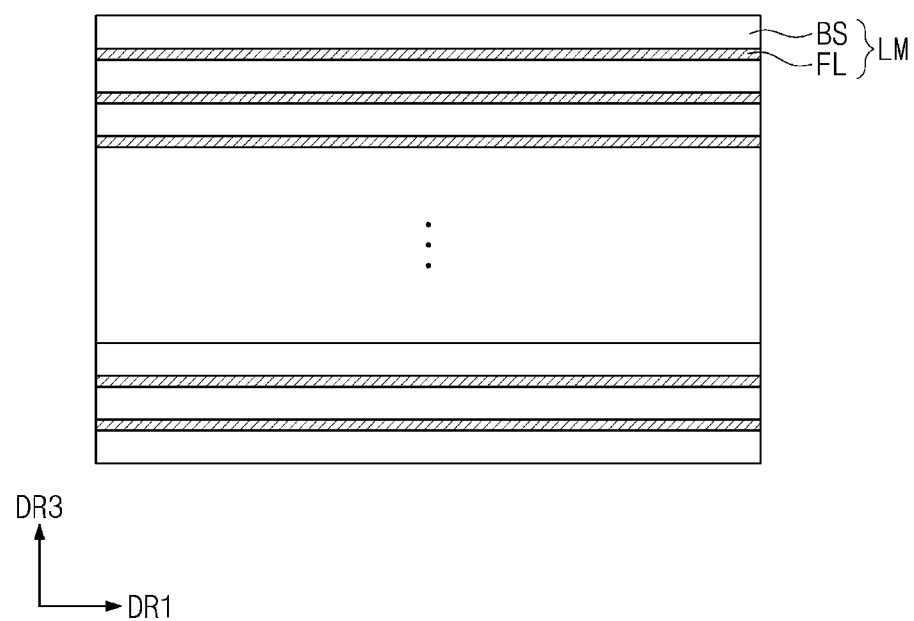
FIG. 3 is a cross-sectional view showing a stack structure of base layers and a film according to some embodiments of the present disclosure.

The window WM may include a base layer BS (refer to FIG. 3). The base layer BS may include a flexible glass substrate or a synthetic resin film. When the base layer BS includes the flexible glass substrate, the glass substrate may have a thickness that is equal to or smaller than about 80 micrometers. Accordingly, the glass substrate may be referred to as a thin film glass substrate. As an example, the base layer BS may have a thickness of about 30 micrometers, however, the thickness of the base layer BS should not be limited thereto or thereby. When the base layer BS includes the synthetic resin film, the base layer BS may include a polyimide (PI) film or a polyethylene terephthalate (PET) film. When the base layer BS includes the synthetic resin film, the base layer BS may have a thickness of about 50 micrometers. The base layer BS may have a single-layer or multi-layer structure. Hereinafter, the base layer BS will be described as the thin film glass substrate.

The display module DM may be coupled to the base layer BS by the adhesive film AF. As an example, the adhesive film AF may include an optically clear adhesive film (OCA). However, the adhesive film AF should not be limited thereto or thereby, and the adhesive film AF may include a conventional adhesive. For example, the adhesive film AF may include an optically clear resin (OCR) or a pressure sensitive adhesive (PSA) film.

FIG. 3 is a cross-sectional view showing a stack structure LM of base layers and a film(s) according to some embodiments of the present disclosure.

Referring to FIG. 3, the stack structure LM may include flexible base layers BS extending in the first direction DR1 and films FL located between respective ones of the base layers BS. The base layers BS and the films FL may be stacked in the third direction DR3.

Among the base layers BS, two base layers BS adjacent to each other may be coupled with each other by one film FL located between the two base layers BS.

The film FL may include an optically clear adhesive (OCA) film. As an example, one film FL located between two base layers BS adjacent to each other may be cured at a room temperature, and thus, the two base layers BS may be coupled with each other.

One base layer BS may be peeled off from the stack structure LM using a peeling device PD described later, and then, the one base layer BS may be manufactured as the window WM (refer to FIG. 2) employed in the display device DD (refer to FIG. 1A). The stack structure LM may be formed by cutting a stacked mother substrate, which is formed by coupling a plurality of mother substrates stacked with a film interposed therebetween, to a cell size (a size corresponding to the display device). In a case where the stack structure LM is formed by cutting the stacked mother substrate, a peeling process to peel off the film FL from the base layer BS is suitable. However, a work efficiency of the manufacturing process for the base layer BS may be improved as compared with a method of forming the base layer BS, which has a size corresponding to the cell size, by cutting one mother substrate.

The stack structure LM may further include dummy base layers. The dummy base layers may be provided to protect base layers respectively located at uppermost and lowermost positions among the base layers BS. The process of peeling off the base layer BS from the film FL using the peeling device PD shown in FIGS. 4 to 8 may be carried out after the dummy base layers are removed from the stack structure LM.

Figure 4:
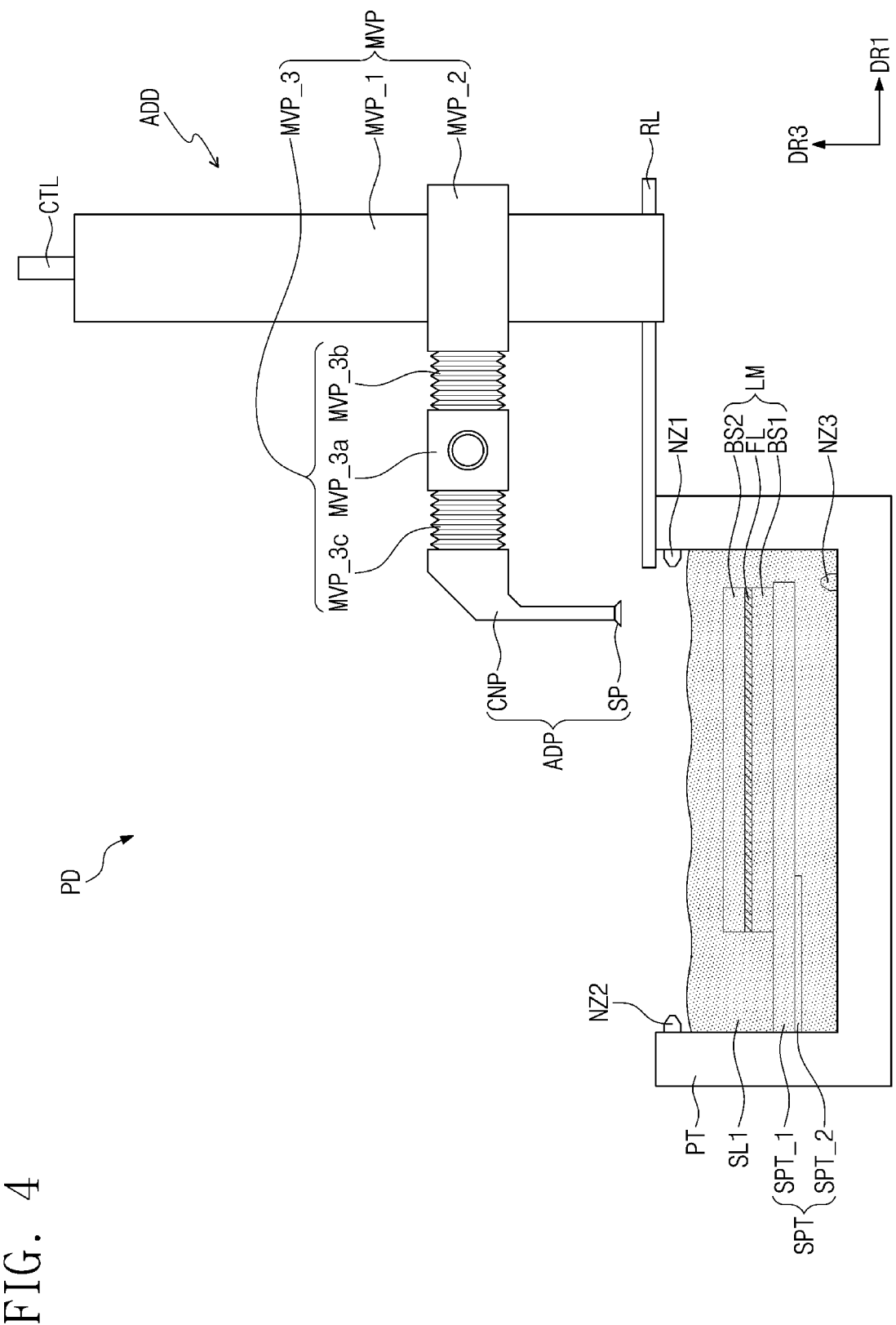
FIG. 4 is a view showing a process of locating a stack structure on a support portion according to some embodiments of the present disclosure.

FIG. 4 is a view showing a process of locating the stack structure LM on a support portion SPT according to some embodiments of the present disclosure.

Referring to FIG. 4, the peeling device PD may include a peeling tank PT with a first solution SL1, and the support portion SPT supporting the stack structure LM, in the peeling tank PT. Hereinafter, for the convenience of explanation, the stack structure LM will be described as a structure that includes two base layers (hereinafter, referred to as a first base layer BS1 and a second base layer BS2) and the film FL located between the first and second base layers BS1 and BS2 to couple the first base layer BS1 to the second base layer BS2 to each other. However, the number of the base layers included in the stack structure LM should not be particularly limited.

The peeling device PD may further include an adsorption device ADD that adsorbs (e.g., clings to) the second base layer BS2 that is to be peeled off among the first and second base layers BS1 and BS2 included in the stack structure LM.

As an example, the first solution SL1 may be a solution that does not exert influences on physical and chemical properties of the first and second base layers BS1 and BS2. As an example, the first solution SL1 may include water. The first solution SL1 may maintain an appropriate temperature to lower a cohesive strength of materials constituting the film FL. When the cohesive strength of the materials constituting the film FL is lowered, an adhesion of the film FL may be lowered. Accordingly, the first and second base layers BS1 and BS2 may be easily peeled off from the film FL. As an example, the temperature of the first solution SL1 may be within a range from about 50° C. to about 90° C.

The support portion SPT may include a support stage SPT_1 and a moving stage SPT_2.

The stack structure LM may be located on the support stage SPT_1. The moving stage SPT_2 may connect the peeling tank PT to the support stage SPT_1. The moving stage SPT_2 may move the support stage SPT_1 in the third direction DR3 or in a direction that is opposite to the third direction DR3. The operation of the moving stage SPT_2 will be described in detail with reference to FIGS. 6 to 9.

The adsorption device ADD may include an adsorption portion ADP that adsorbs the second base layer BS2 and a moving portion MVP that is coupled with the adsorption portion ADP to move the adsorption portion ADP.

The adsorption portion ADP may include a plurality of adsorption pads SP that may be adsorbed to the second base layer BS2, and a connection portion CNP that connects the moving portion MVP to the adsorption pads SP. As an example, the adsorption portion ADP may allow the adsorption pads SP to be adsorbed to the second base layer BS2 by vacuuming a space between the adsorption pads SP and the second base layer BS2.

The moving portion MVP may include a first moving portion MVP_1, a second moving portion MVP_2, and a third moving portion MVP_3. In a case where the first, second, and third moving portions MVP_1, MVP_2, and MVP_3 move, the adsorption portion ADP coupled with the moving portion MVP may move together with the first, second, and third moving portions MVP_1, MVP_2, and MVP_3. As an example, the moving portion MVP may be coupled with the adsorption portion ADP, and may move the adsorption portion ADP such that the second base layer BS2 adsorbed to the adsorption portion ADP is bent toward the third direction DR3 crossing the first direction DR1, and thus, the second base layer BS2 may be peeled off from the film FL. In detail, the first moving portion MVP_1 may move in the first direction DR1 or in a direction that is opposite to the first direction DR1 to move the adsorption portion ADP in the first direction DR1 or in the direction that is opposite to the first direction DR1. The second moving portion MVP_2 may move in the third direction DR3 or in the direction that is opposite to the third direction DR3 to move the adsorption portion ADP in the third direction DR3 or in the direction that is opposite to the third direction DR3.

The third moving portion MVP_3 may include a first sub-moving portion MVP_3a, a second sub-moving portion MVP_3b, and a third sub-moving portion MVP_3c. The first sub-moving portion MVP_3a may connect the second and third sub-moving portions MVP_3b and MVP_3c. The second sub-moving portion MVP_3b may connect the first sub-moving portion MVP_3a and the second moving portion MVP_2. The third sub-moving portion MVP_3c may connect the adsorption portion ADP and the first sub-moving portion MVP_3a. The second and third sub-moving portions MVP_3b and MVP_3c may extend in the first direction DR1 or in the third direction DR3. The first sub-moving portion MVP_3a may rotate the third sub-moving portion MVP_3c. As an example, the first sub-moving portion MVP_3a may rotate the third sub-moving portion MVP_3c in a counter-clockwise direction. However, the rotation direction of the third sub-moving portion MVP_3c by the first sub-moving portion MVP_3a may be changed depending on the shape of the adsorption portion ADP connected to the third sub-moving portion MVP_3c.

The peeling device PD may further include a first nozzle NZ1, a second nozzle NZ2, a third nozzle NZ3, a rail RL, and a controller CTL. The first, second, and third nozzles NZ1, NZ2, and NZ3 will be described later with reference to FIG. 7B.

The rail RL may connect the first moving portion MVP_1 and the peeling tank PT. The first moving portion MVP_1 may move in the first direction DR1 or in the direction that is opposite to the first direction DR1 along the rail RL.

The controller CTL may be coupled with the moving portion MVP, and may control a movement of the moving portion MVP that is used to move the adsorption portion ADP. In addition, the controller CTL may control a position of the support portion SPT, the temperature of the first solution SL1 in the peeling tank PT, and the operation of the first, second, and third nozzles NZ1, NZ2, and NZ3.

Figure 5A:
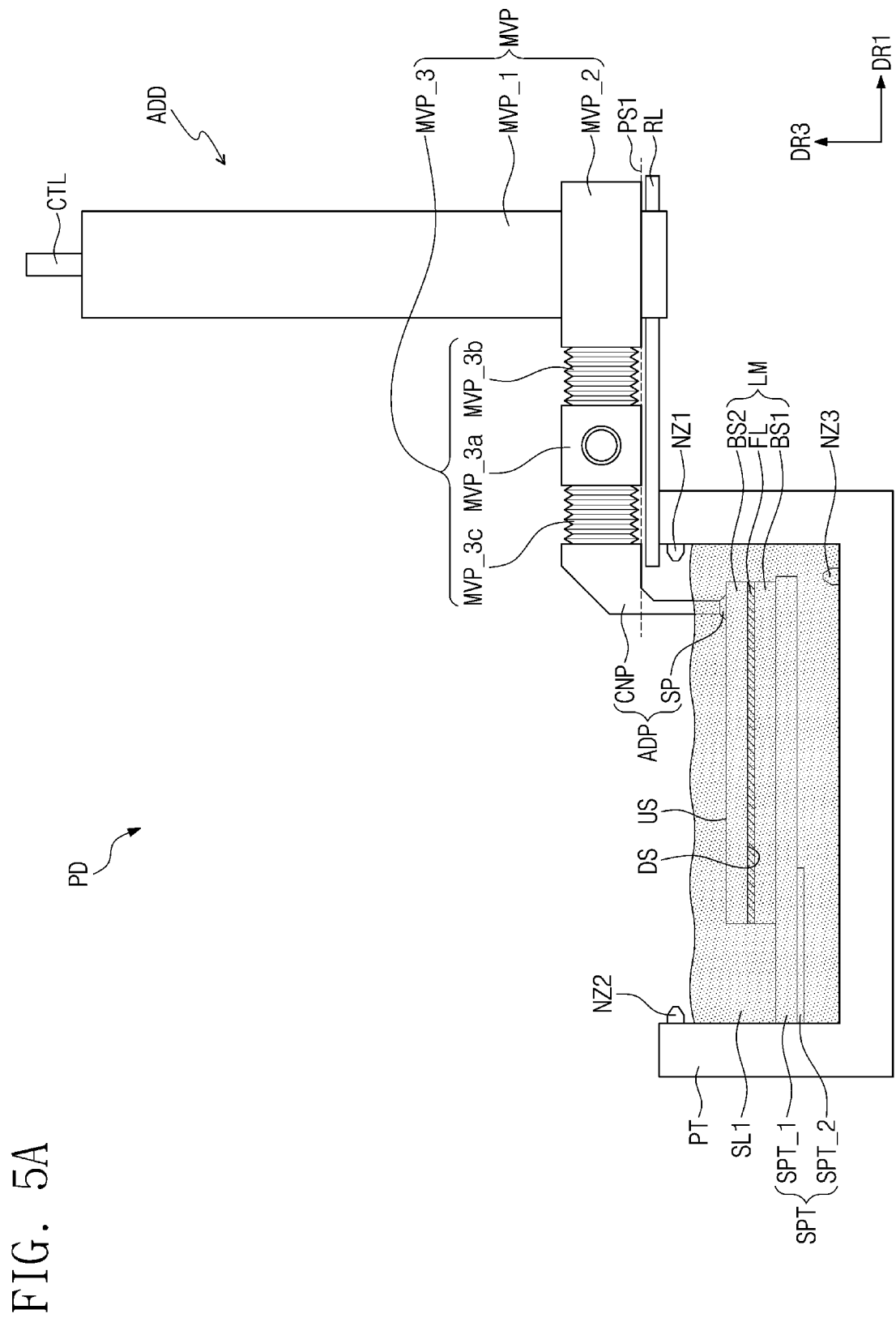
FIG. 5A is a view showing a process of adsorbing a second base layer onto an adsorption device according to some embodiments of the present disclosure.
Figure 5B:
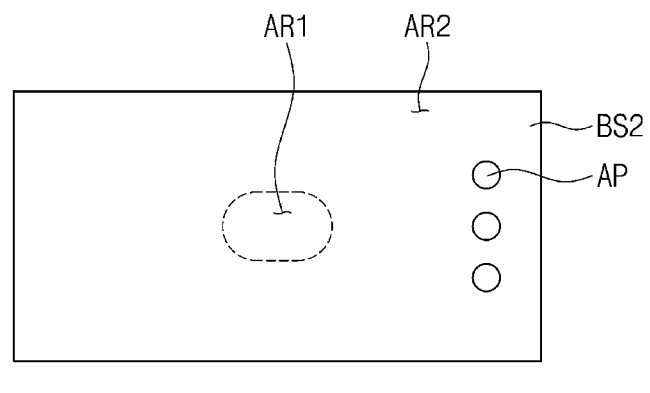
FIG. 5B is a plan view of a second base layer to show adsorption points according to some embodiments of the present disclosure.
Figure 5B:

FIG. 5A is a view showing a process of adsorbing the second base layer BS2 onto the adsorption device ADD according to some embodiments of the present disclosure, and FIG. 5B is a plan view of the second base layer to show adsorption points AP according to some embodiments of the present disclosure.

In FIGS. 5A to 9, the same reference numerals denote the same elements in FIG. 4, and thus, detailed descriptions of the same elements will be omitted.

Referring to FIG. 5A, the second base layer BS2 may include an upper surface US, which is adsorbed onto the adsorption portion ADP, and a lower surface DS, which is coupled with the film FL.

The second moving portion MVP_2 may move in the direction that is opposite to the third direction DR3 to allow the adsorption pad SP of the adsorption portion ADP to be adsorbed to the second base layer BS2. In this case, the second moving portion MVP_2 may move the adsorption portion ADP to a first position PS1.

Referring to FIG. 5B, the second base layer BS2 may include a first area AR1 located at a center portion of the second base layer BS, and a second area AR2 around the first area AR1. When positions at which the adsorption pads SP are absorbed to the second base layer BS2 are referred to as the adsorption points AP, the adsorption points AP may be located in the second area AR2. As an example, the adsorption pads SP may be absorbed to the second base layer BS2 at one end among both ends of long sides extending in the first direction DR1 of the second base layer BS2. In addition, the adsorption pads SP may include three adsorption pads. However, the number of the adsorption pads SP should not be particularly limited.

Figure 6:
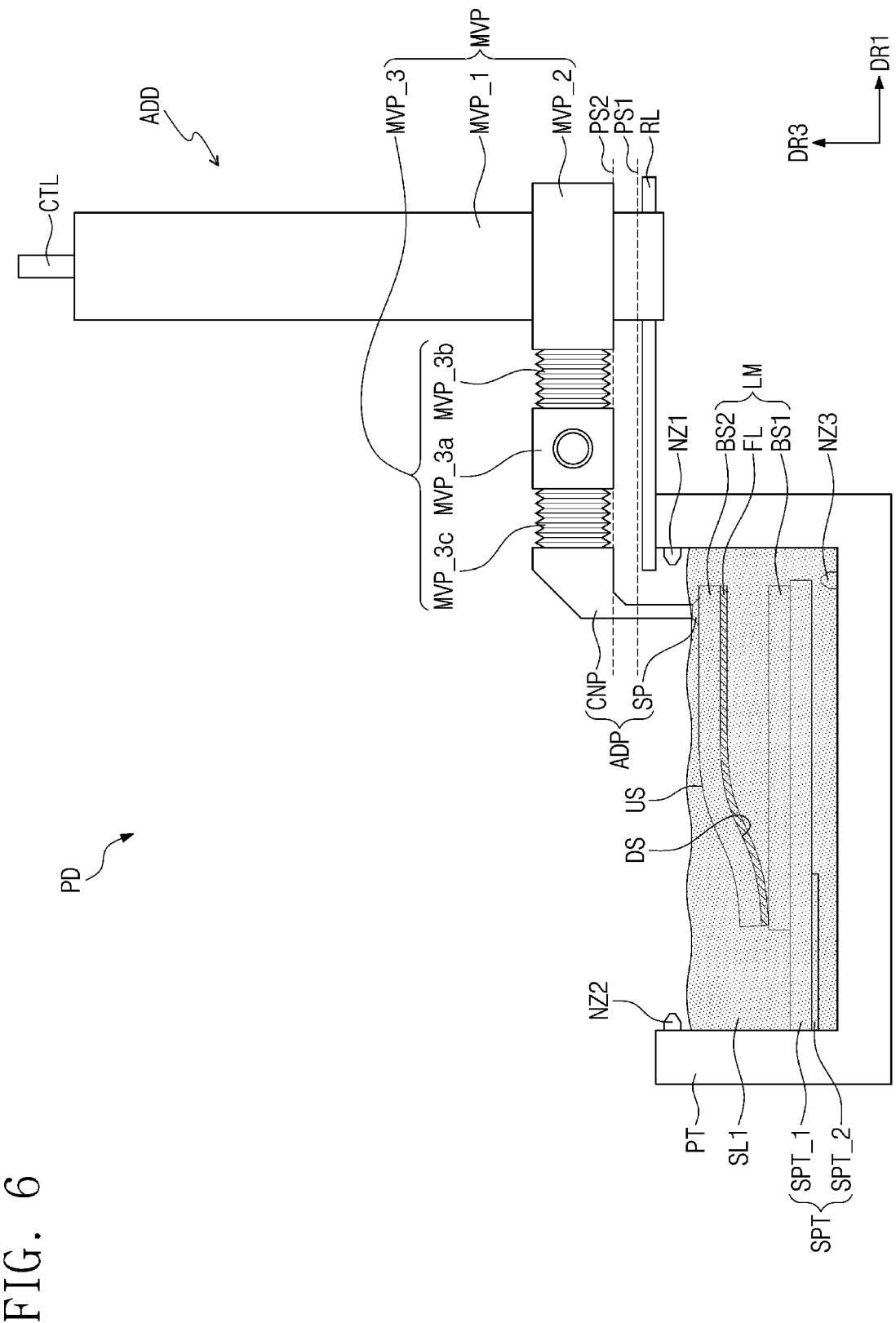
FIG. 6 is a view showing a process of peeling a first base layer from a film according to some embodiments of the present disclosure.

FIG. 6 is a view showing a process of peeling the first base layer BS1 from the film FL according to some embodiments of the present disclosure.

As an example, the second moving portion MVP_2 may move in the third direction DR3 to move the adsorption portion ADP to a second position PS2 from the first position PS1. The first and second base layers BS1 and BS2 containing a thin film glass substrate may have a specific gravity that is greater than that of the first solution SL1 containing the water. Accordingly, the second base layer BS2 adsorbed to the adsorption portion ADP may move in the third direction DR3 together with the adsorption portion ADP, however, the first base layer BS1 that is not adsorbed to the adsorption portion ADP may not move on the support stage SPT_1. On the other hand, the film FL may have a specific gravity that is less than that of the first solution SL1. Accordingly, when the second base layer BS2 moves in the third direction DR3, the film FL located under the second base layer BS2 may move in the third direction DR3. Consequently, the adsorption portion ADP may move to the second position PS2 from the first position PS1 by the second moving portion MVP_2. Thus, the film FL may be peeled off from the first base layer BS1, and the second base layer BS2 may be separated from the first base layer BS1.

As an example, the support stage SPT_1 may move in the direction that is opposite to the third direction DR3 by the moving stage SPT_2 while the adsorption portion ADP moves to the second position PS2 from the first position PS1 by the second moving portion MVP_2. In the case where the support stage SPT_1 moves in the direction that is opposite to the third direction DR3, the first base layer BS1 located on the support stage SPT_1 may move in the direction that is opposite to the third direction DR3. Accordingly, a separation distance between the film FL and the first base layer BS1, and a separation distance between the second base layer BS2 and the first base layer BS1, may be further obtained. As the separation distance between the first base layer BS1 and the second base layer BS2 is further obtained, damage on the second base layer BS2 caused by the first base layer BS1 during the process of rotating the second base layer BS2 in the third direction DR3 may be reduced or prevented. As an example, the separation distance between the film FL and the first base layer BS1 separated from the film FL may be tens of centimeters.

As an example, the first and second base layers BS1 and BS2 may be flexible. Accordingly, a portion of the second base layer BS2, which is close to the portion of the second base layer BS2 adsorbed onto the adsorption portion ADP, may move in the third direction DR3 together with the adsorption portion ADP, and a portion of the second base layer BS2, which is farther away from the portion of the second base layer BS2 adsorbed onto the adsorption portion ADP, may sag down by gravity. In this case, only a portion of the film FL located at a lower end of the second base layer BS2, which is close to the portion adsorbed to the adsorption portion ADP, may be peeled off from the first base layer BS1, and the other portion of the film FL located at the lower end of the second base layer BS2, which is farther away from the portion adsorbed to the adsorption portion ADP, might not be peeled off from the first base layer BS1.

Figure 7A:
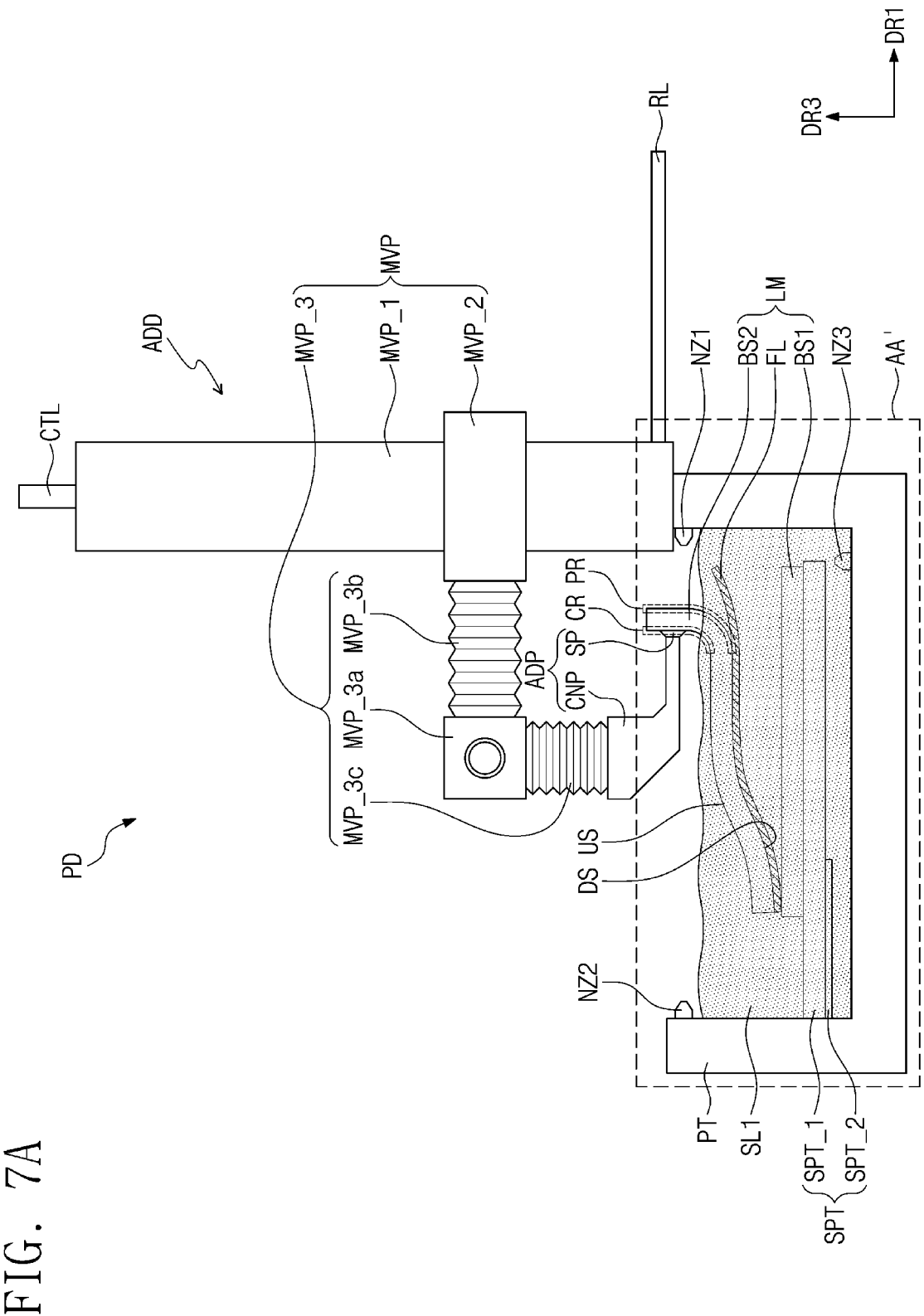
FIG. 7A is a view showing a process of moving an adsorption portion to allow a second base layer to be bent to a third direction according to some embodiments of the present disclosure.
Figure 7B:
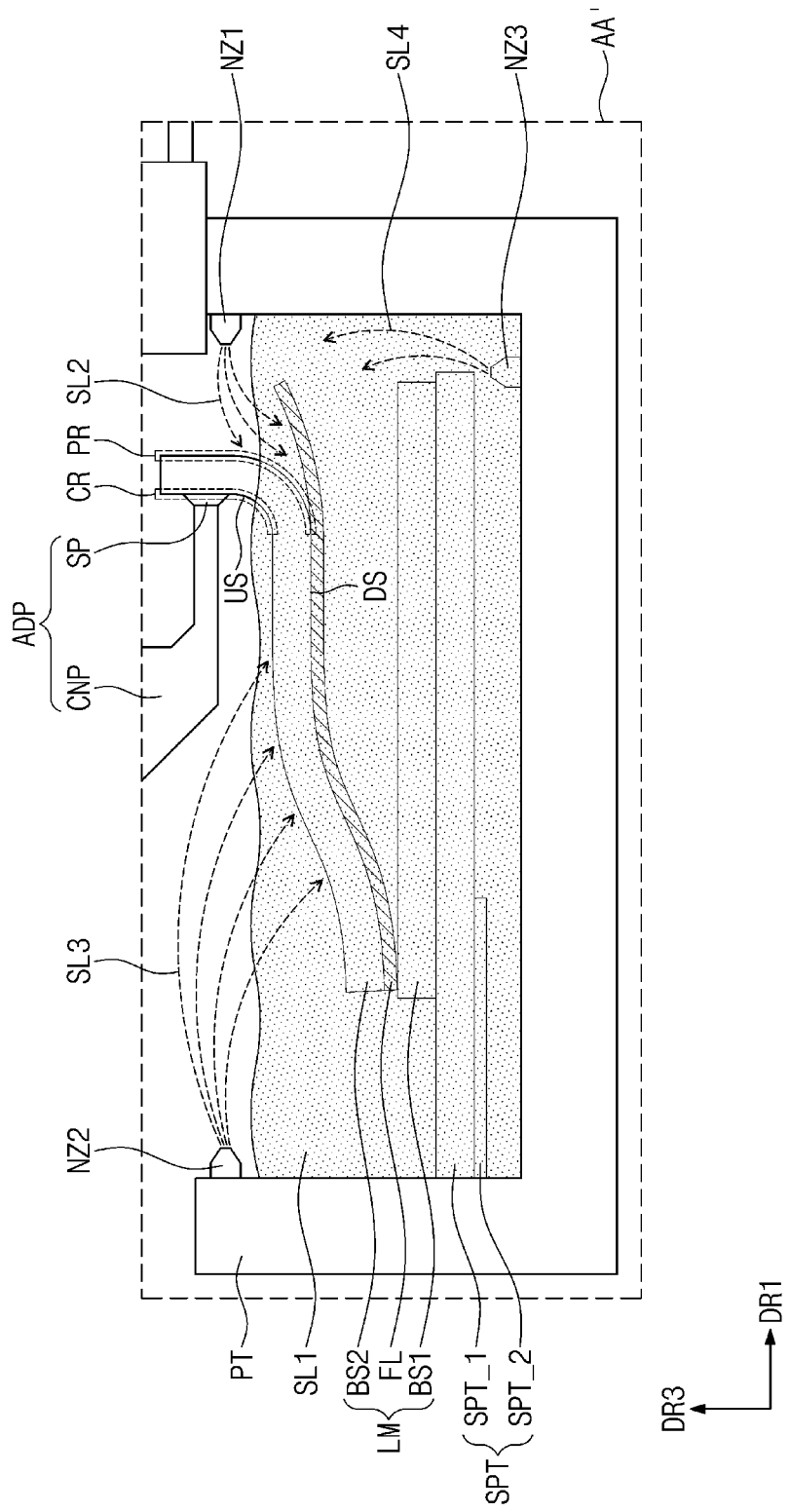
FIG. 7B is an enlarged view showing a portion of the peeling device corresponding to an area AA' of FIG. 7A to explain first to third nozzles.

FIG. 7A is a view showing a process of moving the adsorption portion ADP to allow the second base layer BS2 to be bent toward the third direction according to some embodiments of the present disclosure, and FIG. 7B is an enlarged view showing a portion of the peeling device PD corresponding to an area AA' of FIG. 7A to explain the first to third nozzles NZ1 to NZ3.

Referring to FIG. 7A, the first sub-moving portion MVP_3a may rotate the third sub-moving portion MVP_3c in a counter-clockwise direction. Because the third sub-moving portion MVP_3c is connected to the adsorption portion ADP adsorbed to the second base layer BS2, the first sub-moving portion MVP_3a may rotate the third sub-moving portion MVP_3c and may move the adsorption portion ADP to allow the second base layer BS2 to be bent.

As an example, when the first sub-moving portion MVP_3a moves the adsorption portion ADP, the first moving portion MVP_1 may move in the direction that is opposite to the first direction DR1, and the second moving portion MVP_2 may move in the third direction DR3. However, the movement direction of the first and second moving portions MVP_1 and MVP_2 and the rotation direction of the first sub-moving portion MVP_3a may be changed depending on the shape of the peeling device PD.

As an example, the third direction DR3 may be substantially perpendicular to the first direction DR1. That is, the first sub-moving portion MVP_3a may move the adsorption portion ADP such that the second base layer BS2 is bent to a direction substantially perpendicular to the first direction DR1. However, the third direction DR3 should not be limited to the direction perpendicular to the first direction DR1. As an example, the third direction DR3 may be a direction that forms an angle of about 70° with the first direction DR1.

The portion of the second base layer BS2, which is close to the portion adsorbed to the adsorption pad SP, may be bent to the third direction DR3 and may be exposed above the water surface of the first solution SL1 contained in the peeling tank PT. In this case, the film FL located at a lower end of the exposed portion of the second base layer BS2 may be dragged in the direction that is opposite to the third direction DR3 by a surface resistance of the first solution. Accordingly, the exposed portion of the second base layer BS2 may be peeled off from the film FL located at the lower end of the exposed portion. An area of the lower surface DS of the second base layer BS2 coupled with the film FL, which is peeled off from the film FL, may be defined as a peeling area PR. A portion of the upper surface US of the second base layer BS2, which is bent to the third direction DR3 by the adsorption device ADD, may be defined as a curved area CR.

Referring to FIG. 7B, the first nozzle NZ1 and the second nozzle NZ2 may be located above the water surface of the first solution SL1 contained in the peeling tank PT. When the second base layer BS2 is bent to the third direction DR3 by the adsorption device ADD, the first nozzle NZ1 may be located to face the peeling area PR of the lower surface DS of the second base layer BS2. When the second base layer BS2 is bent to the third direction DR3 by the adsorption device ADD, the second nozzle NZ2 may be located to face the curved area CR of the upper surface US of the second base layer BS2.

In order to peel off the second base layer BS2 from the film FL, the adsorption part ADP is moved to allow the second base layer BS2 to be bent toward the third direction DR3. At this time, the second solution SL2 is being sprayed toward the peeling area PR and the film FL through the first nozzle NZ1, and thus, the second base layer BS2 may be easily peeled off from the film FL. A third solution SL3 may be sprayed to the upper surface US of the second base layer BS2 via the second nozzle NZ2, and thus, foreign substances in the peeling tank PT may be reduced or prevented from remaining in the second base layer BS2. As an example, the second and third solutions SL2 and SL3 may include the same material as that of the first solution SL1. The second and third solutions SL2 and SL3 may include water.

As an example, the third nozzle NZ3 may be located on a bottom of the peeling tank PT. The third nozzle NZ3 may spray a fourth solution SL4 to the third direction DR3 to prevent the second base layer BS2 and the film FL from sinking in the direction that is opposite to the third direction DR3. The fourth solution SL4 may include the same material as that of the first solution SL1.

Figure 8:
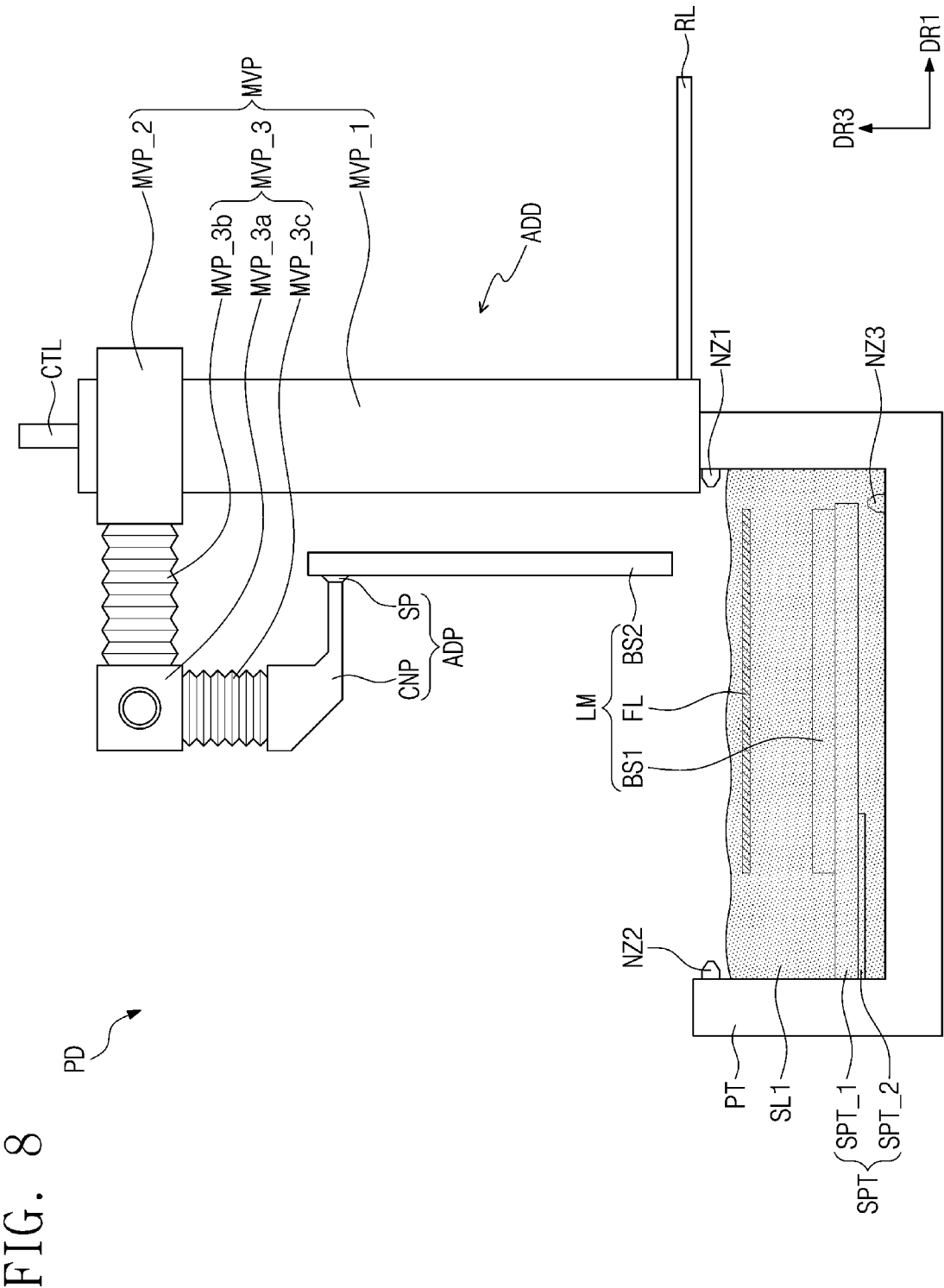
FIG. 8 is a view showing a process of taking a second base layer out of a peeling tank according to some embodiments of the present disclosure.

FIG. 8 is a view showing a process of taking the second base layer BS2 out of the peeling tank PT according to some embodiments of the present disclosure.

Referring to FIG. 8, the second moving portion MVP_2 may move in the third direction DR3 to move the adsorption portion ADP in the third direction DR3. Because the second base layer BS2 is adsorbed to the adsorption portion ADP, the second moving portion MVP_2 may move the adsorption portion ADP in the third direction DR3, and may take the second base layer BS2 out of the peeling tank PT.

Referring to FIGS. 7A and 7B again, the portion of the second base layer BS2, which is close to the portion adsorbed to the adsorption pad SP, may be exposed above the surface of the first solution SL1 contained in the peeling tank PT. Accordingly, when the adsorption portion ADP moves in the third direction DR3 to take the second base layer BS2 out of the peeling tank PT, the entire second base layer BS2 located under the surface of the first solution SL1 does not move in the third direction DR3 at once, and the second base layer is moved in the third direction DR3 gradually starting from the portion of the second base layer BS2 that is initially exposed above the water surface of the first solution SL1. The second base layer BS2 located under the water surface of the first solution SL1 may be dragged in the direction that is opposite to the third direction DR3 by the surface resistance of the first solution SL1 when moving in the third direction DR3.

Accordingly, in a case where the second base layer BS2 is taken out of the peeling tank PT without performing the process of bending the second base layer BS2 to the third direction DR3 using the adsorption device ADD (e.g., according to embodiments of the present disclosure), the entire second base layer BS2 may be dragged by the first solution SL1 and may be damaged. On the other hand, in the case where the second base layer BS2 is taken out of the peeling tank PT after bending the second base layer BS2 to the third direction DR3 using the adsorption device ADD according to embodiments of the present disclosure, the drag applied to the second base layer BS2 from the first solution SL1 may be reduced, and thus, damage to the second base layer BS2 may be prevented or reduced.

Figure 9:
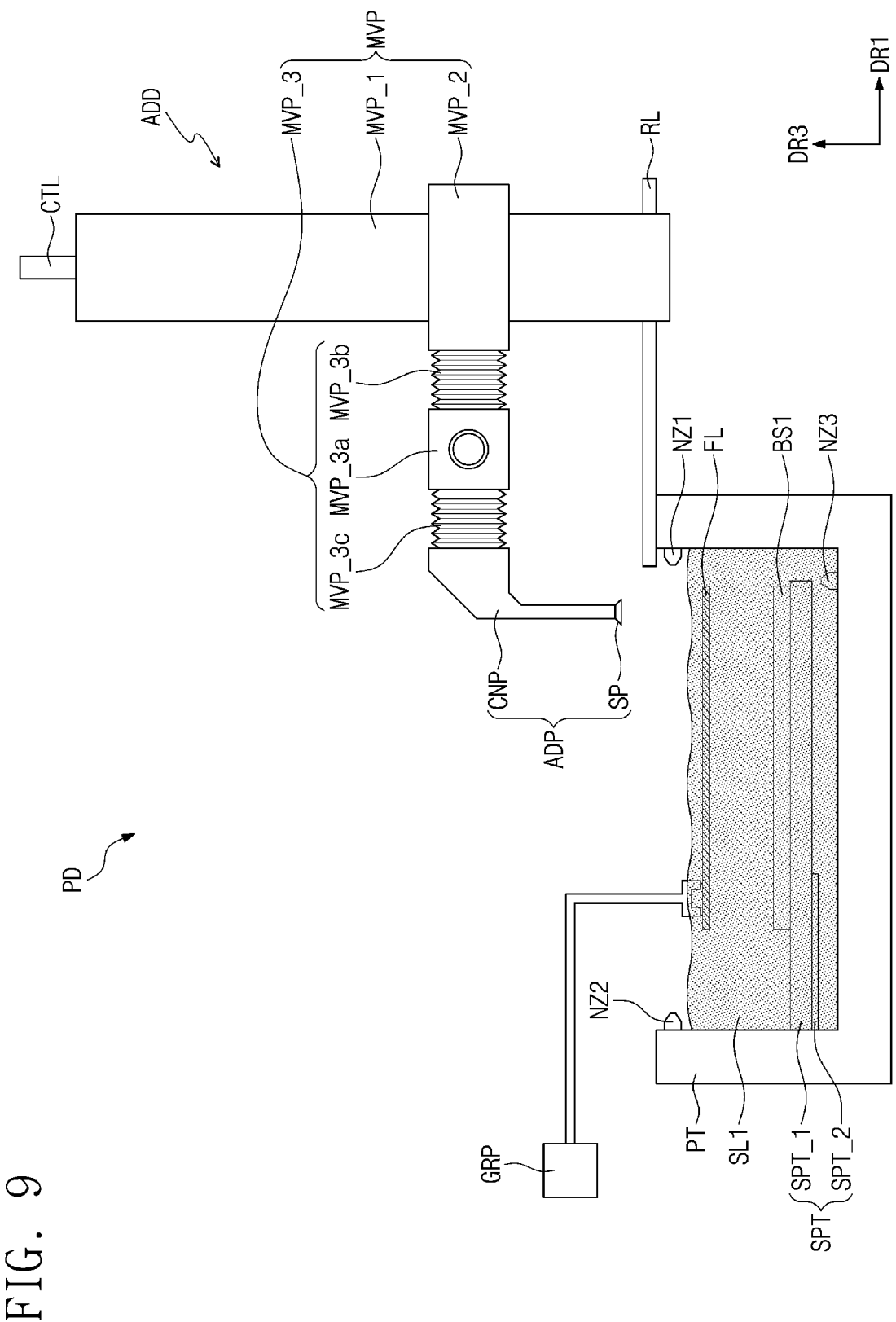
FIG. 9 is a view showing a process of removing a film from a peeling tank using a grip device according to some embodiments of the present disclosure.

FIG. 9 is a view showing a process of removing the film FL out of the peeling tank PT using a grip device GRP according to some embodiments of the present disclosure.

Referring to FIG. 9, the peeling device PD may further include the grip device GRP that grips the film FL and removes the film FL out of the peeling tank PT.

After the second base layer BS2 (refer to FIG. 8) is peeled off from the film FL and taken out of the peeling tank PT using the adsorption device ADD, the film FL and the first base layer BS1, which are separated from each other due to the difference in specific gravity, may remain in the peeling tank PT. FIGS. 4 to 9 show the stack structure LM including the first and second base layers BS1 and BS2 and one film FL located between the first and second base layers BS1 and BS2, however, the stack structure LM may include a plurality of base layers and a plurality of films coupling the base layers to each other. Accordingly, in another example, after the second base layer BS2 is taken out of the peeling tank PT, an additional process of peeling the first base layer BS1 from another film, and taking the first base layer BS1 out of the peeling tank PT may be repeated. In this case, the film FL remaining in the peeling tank PT and located above the first base layer BS1 is required to be removed to adsorb the adsorption portion ADP onto the first base layer BS1. Accordingly, the grip device GRP may grip the remaining film FL and may remove the film FL from the peeling tank PT. However, the shape of the grip device GRP shown in FIG. 9 is merely an example. The grip device GRP may have a variety of shapes to perform the operation of removing the film FL.

When the film FL is removed by the grip device GRP, the adsorption device ADD may allow the first base layer BS1 to be adsorbed to the adsorption portion ADP. In this case, the support stage SPT_1 may move in the third direction DR3 by the moving stage SPT_2. When the support stage SPT_1 moves in the third direction DR3, the first base layer BS1 located on the support stage SPT_1 may also move in the third direction DR3. Accordingly, the first base layer BS1 may be easily adsorbed to the adsorption portion ADP.

According to the present disclosure, the second base layer BS2 is peeled off of the film FL using the peeling device PD instead of manually peeling the second base layer BS2 from the film FL by an operator, and thus, reliability and efficiency of the peeling process of the second base layer BS2 may be improved.

Figure 10:
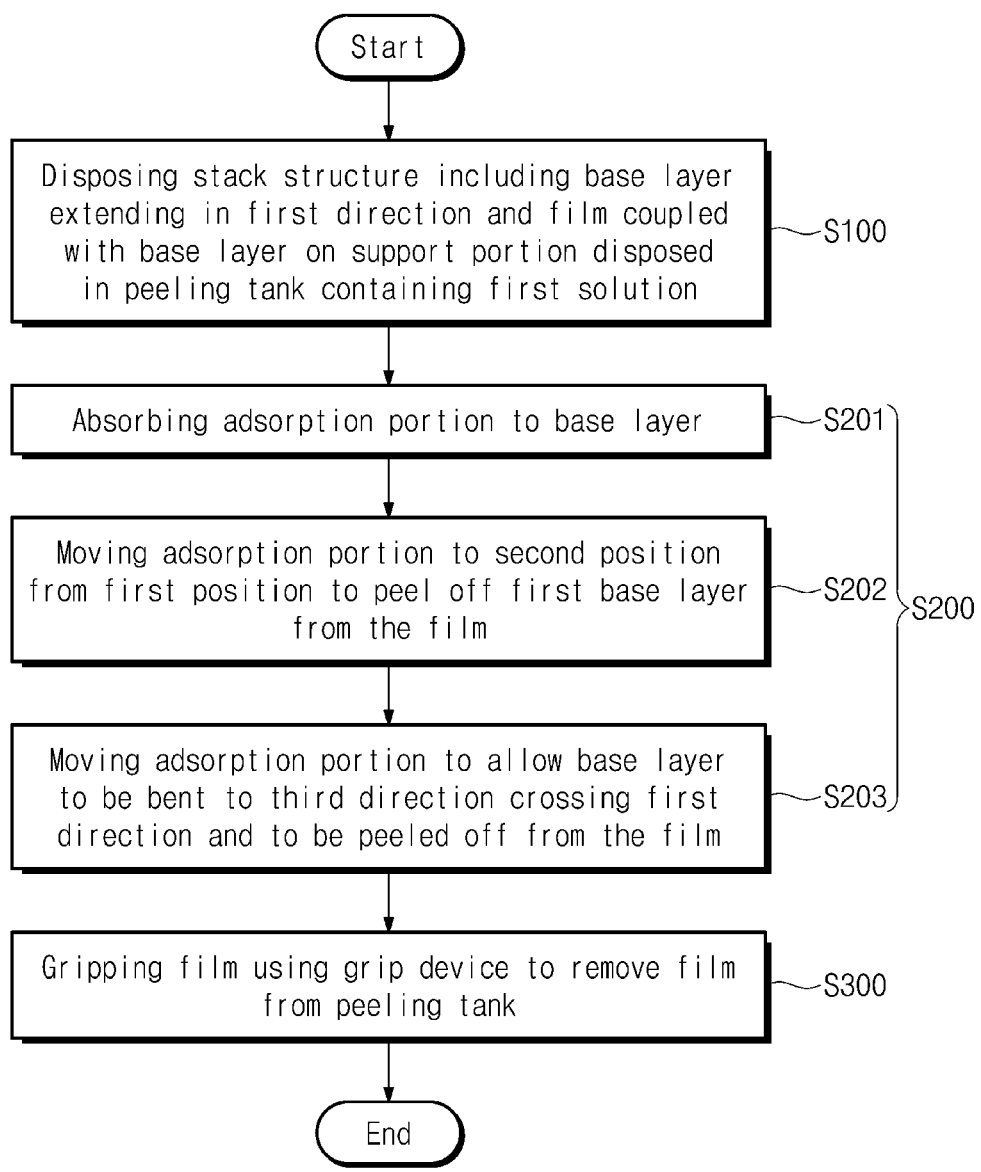
FIG. 10 is a flowchart showing a peeling method of the peeling device according to some embodiments of the present disclosure.
Figure 11:
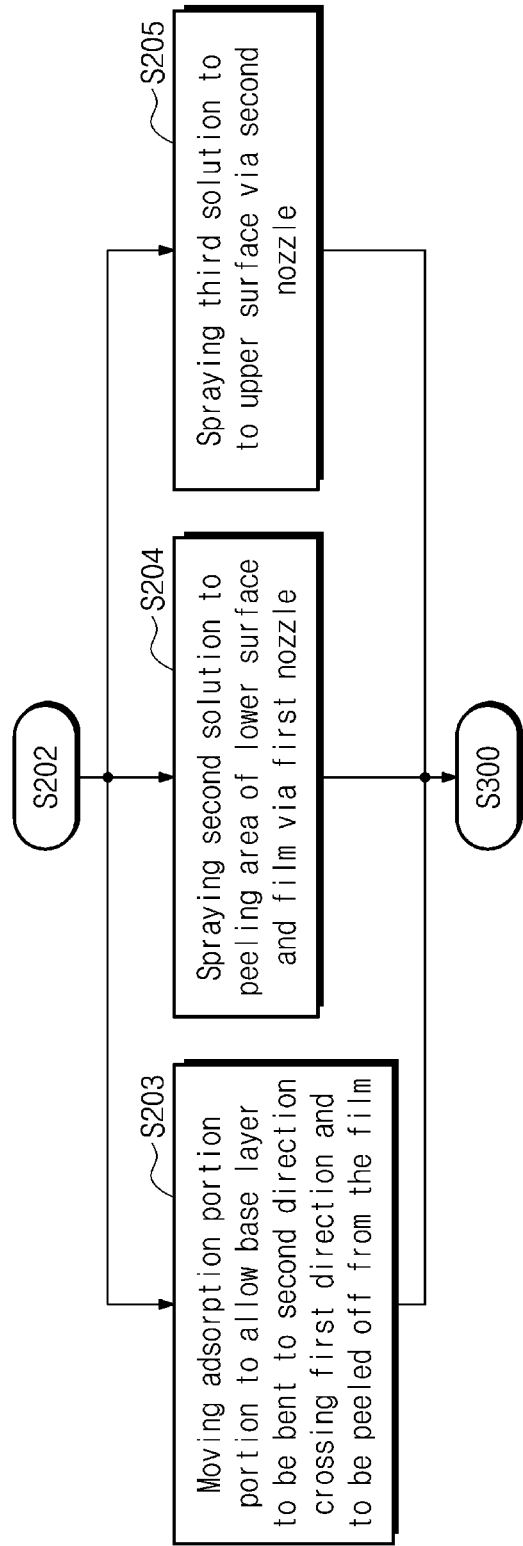
FIG. 11 is a flowchart showing a process of peeling a base layer from a film and a process of spraying second and third solutions through first and second nozzles according to some embodiments of the present disclosure.

FIG. 10 is a flowchart showing a peeling method of the peeling device according to some embodiments of the present disclosure, and FIG. 11 is a flowchart showing a process of peeling the base layer from the film, and a process of spraying the second and third solutions through the first and second nozzles, according to some embodiments of the present disclosure.

Referring to FIGS. 4 and 10, the peeling method using the peeling device PD may include locating the stack structure LM that includes the first and second base layers BS1 and BS2 extending in the first direction DR1, along with the film FL coupled with the first and second base layers BS1 and BS2, on the support portion SPT that is located in the peeling tank PT containing the first solution SL1 (S100). In addition, the peeling method using the peeling device PD may include adsorbing the second base layer BS2 to peel off the second base layer BS2 from the film FL (S200), and gripping the film FL using the grip device GRP (refer to FIG. 9) to remove the film FL from the peeling tank (S300).

Referring to FIGS. 5A and 10, the adsorbing of the second base layer BS2 to peel off the second base layer BS2 from the film FL (S200) may include adsorbing the adsorption portion ADP to the second base layer BS2 (S201).

Referring to FIGS. 6 and 10, the adsorbing of the second base layer BS2 to peel off the second base layer BS2 from the film FL (S200) may include moving the adsorption portion ADP to the second position PS2 from the first position PS1 to peel off the first base layer BS1 from the film FL (S202).

Referring to FIGS. 7A and 10, the adsorbing of the second base layer BS2 to peel off the second base layer BS2 from the film FL (S200) may include moving the adsorption portion ADP to allow the second base layer BS2 to be bent to a third direction DR3 crossing the first direction DR1 and to be peeled off from the film FL (S203).

Referring to FIGS. 8 and 10, the adsorbing of the second base layer BS2 to peel off the second base layer BS2 from the film FL (S200) may further include moving the adsorption portion ADP in the third direction DR3 to take the second base layer BS2 out of the peeling tank PT.

Referring to FIGS. 9 and 10, after the adsorbing of the second base layer BS2 to peel off the second base layer BS2 from the film FL (S200), gripping the film FL using the grip device GRP to remove the film FL from the peeling tank (S300) may be performed.

Referring to FIGS. 7B and 11, the adsorbing of the second base layer BS2 to peel off the second base layer BS2 from the film FL (S200) may further include spraying the second solution SL2 to the peeling area PR of the lower surface DS of the second base layer BS2 and the film FL via the first nozzle NZ1 (S204). In addition, the adsorbing of the second base layer BS2 to peel off the second base layer BS2 from the film FL (S200) may further include spraying the third solution SL3 to the upper surface US of the second base layer BS2 via the second nozzle NZ2 (S205).

As an example, the spraying of the second solution SL2 via the first nozzle NZ1 (S204) and the spraying of the third solution SL3 via the second nozzle NZ2 (S205) may be substantially simultaneously performed with the peeling off of the second base layer BS2 from the film FL (S203).

Although embodiments of the present disclosure have been described, it is understood that the present disclosure should not be limited to these embodiments but various changes and modifications can be made by one ordinary skilled in the art within the spirit and scope of the present disclosure as hereinafter claimed.

Therefore, the disclosed subject matter should not be limited to any of the embodiments described herein, and the scope of the present disclosure shall be determined according to the attached claims, with the functional equivalents thereof to be included therein.

What is claimed is:

1. A peeling device comprising:
a peeling tank containing a first solution therein;
a support portion on which a stack structure comprising a base layer extending in a first direction and a film coupled with the base layer is disposed, the support portion being disposed in the peeling tank; and
an adsorption device for adsorbing the base layer thereon to peel off the base layer from the film, the adsorption device comprising:
an adsorption portion for adsorbing the base layer; and
a moving portion coupled with the adsorption portion for moving the adsorption portion to allow the base layer to be bent to a second direction crossing the first direction and to be peeled off from the film.

2. The peeling device of claim 1, wherein the first solution comprises water having a temperature from about 50° C. to about 90° C.

3. The peeling device of claim 1, wherein the base layer comprises:
an upper surface to be adsorbed to the adsorption portion; and
a lower surface coupled with the film, and
wherein the adsorption device is configured to peel the lower surface of the base layer off of the film.

4. The peeling device of claim 3, further comprising a first nozzle, wherein the first nozzle faces a peeling area of the lower surface when the base layer is bent to the second direction by the adsorption device and sprays a second solution to the peeling area of the lower surface and the film, and the second solution comprises a same material as the first solution.

5. The peeling device of claim 4, further comprising a second nozzle, wherein the second nozzle sprays a third solution to the upper surface, and the third solution comprises a same material as the first solution.

6. The peeling device of claim 1, wherein the base layer comprises:
a first base layer; and
a second base layer,
wherein the film comprises an adhesive film between the first and second base layers to attach the first base layer to the second base layer, and
wherein the adsorption portion is configured to be adsorbed to the second base layer.

7. The peeling device of claim 6, further comprising a grip device that grips the film to remove the film from the peeling tank.

8. The peeling device of claim 6, wherein the moving portion is configured to move the adsorption portion with the second base layer adsorbed thereto to a second position from a first position such that the base layer is peeled off from the film before moving the adsorption portion to allow the second base layer to be bent to the second direction.

9. The peeling device of claim 1, wherein the second direction is substantially perpendicular to the first direction.

10. The peeling device of claim 1, wherein the base layer comprises a thin film glass substrate.

11. The peeling device of claim 1, wherein the adsorption portion comprises:
a plurality of adsorption pads configured to be adsorbed to the base layer;
a connection portion connecting the moving portion to the adsorption pads; and
a support for coupling the adsorption pads to the connection portion,
wherein the base layer comprises:
a first area at a center portion of the base layer;
a second area around the first area; and
adsorption points to be adsorbed to the adsorption pads in the second area.

* * * * *